Aug. 4, 1959 L. R. ROSE 2,898,469
X-RAY DIFFRACTION APPARATUS
Filed Sept. 11, 1956
FIG. 1
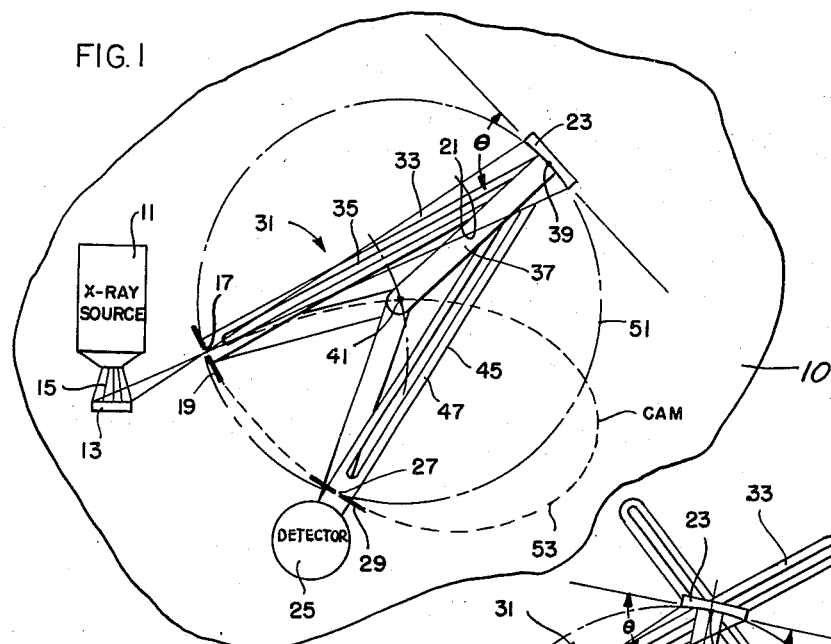
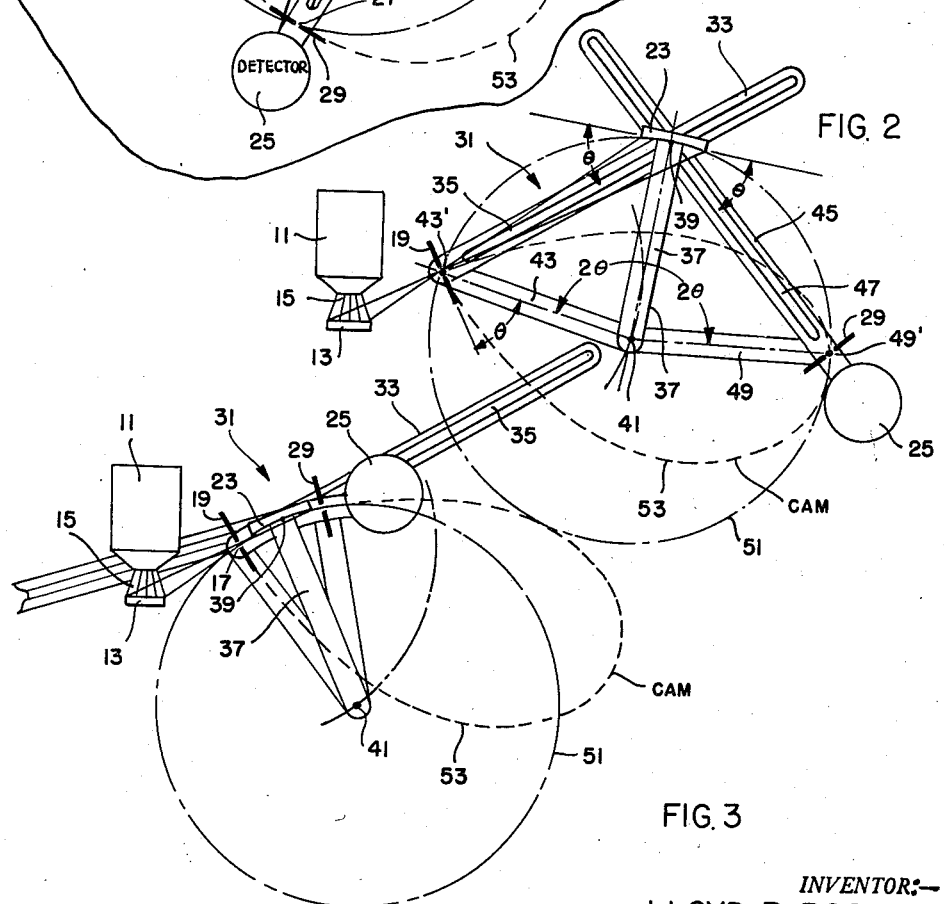
FIG. 2
FIG. 3
INVENTOR:—
LLOYD R. ROSE
BY:—
ATTORNEY

United States Patent Office 2,898,469
Patented Aug. 4, 1959

2,898,469

X-RAY DIFFRACTION APPARATUS

Lloyd R. Rose, Milwaukee, Wis., assignor to General Electric Company, a corporation of New York Application September 11, 1956, Serial No. 609,175

5 Claims. (Cl. 250—53)

The present invention relates in general to X-ray diffraction analysis, and has more particular reference to improved spectrometric apparatus for the analysis of secondary or so-called fluorescent X-rays emitted by an examination specimen when excited by the impingement of primary X-rays thereon.

Any crystalline body may be constituted as a source of fluorescent or secondary radiation in response to the application thereto of an exciting beam of primary rays or charged particles. Such induced radiation is characteristic of the atomic composition of the material of the irradiated specimen, since the same comprises rays having wavelengths and intensity ratios which are characteristic of the irradiated material and the nature of the radiation source. The fluorescent radiation thus emitted by a crystal specimen, when suitably excited by application thereto of a primary X-ray beam, may be detected in the form of an X-ray spectrum as a means for identifying or analyzing the material of the specimen.

As stated in United States Letters Patent No. 2,540,821, which issued February 6, 1951, on the invention of David Harker in X-Ray Spectrometer, it has heretofore been suggested that the apparent intensity of fluorescent specimen emitted X-rays may be increased by use of a bent crystal in obtaining the diffraction spectrum. Such use of a bent crystal, however, involves either the provision of means for altering the curvature of the bent crystal as the detector is moved to scan the resulting spectrum, or the provision of means for altering the spacement between the crystal and the detector during spectrum scanning movement of the detector, in order to keep the diffracted spectrum forming rays focused upon the detector.

An important object of the present invention is to provide fixed focus apparatus for supporting an X-ray detector in position to scan an X-ray spectrum produced by a bent diffraction crystal of fixed configuration, the mechanism serving to maintain the crystal and the detector at all times in an appropriate fixed focus relation with respect to a stationary examination specimen, while permitting the crystal and detector to be adjustably shifted with respect to the stationary specimen in fashion causing the detector to traverse and hence scan the spectrum.

Another object of the invention is to provide spectrometric apparatus of unusual simplicity for the accomplishment of crystal analysis; a further object being to provide apparatus of rugged character, rapidly operable in analyzing the X-ray spectrum of an examination specimen.

Another important object is to provide turnable mechanism for adjusting the angularity of a bent crystal with respect to a stationary examination specimen and simultaneously adjusting a scanning detector with respect to the crystal to maintain the detector at all times in the path of crystal diffracted rays applied thereto from said stationary specimen.

Another important object is to provide an adjustable framework comprising relatively pivoted and relatively slidable links operatively associated with a fixed specimen mounting station and serving to shiftably support a diffraction element comprising a bent crystal and an X-ray spectrum detector, in order to maintain the detector in position with respect to the crystal to receive the impingement of diffraction X-rays directed upon the crystal as the result of X-ray excitation of the examination specimen.

Briefly stated, the invention provides an adjustable supporting framework having a fixed station for receiving an examination specimen, and support members shiftably and turnably mounted with respect to the specimen support station in order to support a detector adjustably in spaced relation with respect to the specimen station, and also to support a bent diffraction crystal at all times and for all adjusted positions of the detector at such an angle with respect to the detector and station as to apply a diffraction spectrum upon the detector in response to the application of fluorescent rays emitted by a specimen at such station and applied upon the diffraction crystal as the result of X-ray excitation of the specimen at the station.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 1 is a diagrammatic view of adjustable mechanism for providing a fixed focus for a bent crystal focusing system for use in X-ray fluorescent spectrographic equipment; and Figs. 2 and 3 illustrate the apparatus in relatively shifted positions.

To illustrate the invention the drawings show X-ray spectrographic apparatus embodying a main frame 10 carrying an X-ray source 11, such as a conventional X-ray generating tube, and an examination specimen 13 of crystalline material to be analyzed, said specimen being supported at a fixed examination station on the main frame in the path of a beam of primary X-rays 15 emitted by the source 11. Application of the X-ray beam 15 upon the specimen 13 will excite the same for the emission of secondary or fluorescent X-rays therefrom, which secondary rays are characteristic of the atomic composition of the specimen. Some of such X-rays may be omitted in a direction to pass through a slit-like opening 17 formed in a pane or panel 19 of material that is relatively impervious to X-rays, said opening 17 thus comprising a stationary source slit defining a beam 21 emitted by the specimen 13 and comprising fluorescent X-rays characteristic of the material of the specimen.

The apparatus of the present invention also embodies a diffraction crystal 23 turnably supported in the path of the beam 21, said crystal serving to diffract the ray beam in known fashion and focus the diffracted beam upon a ray sensitive detector 25, the diffracted beam being delivered through a slit-like opening 27 formed in a plate 29 of material that is relatively opaque to X-rays.

In order to analyze the X-ray spectrum of the diffracted beam, the present invention provides adjustable mechanism 31 operable to progressively alter the inclination at which the ray beam 21 impinges upon the diffraction crystal 23 and the corresponding angularity of the detector 25 in position with respect to the crystal to receive the focused impingement of the diffracted beam on said detector. The mechanism 31 is supported on the main frame and is arranged so that the diffraction crystal 23 is at all times in alined position to receive the impingement of the ray beam 21, the examination sample 13 and the X-ray source 11 at all times remaining fixed on the main frame. The mechanism 31 is also arranged so that the configuration of the diffraction crystal 23 remains fixed.

To these ends, in the mechanism 31 comprises a fixed slide member 33 supported on the main frame and forming a slideway 35 for turnably and slidably receiving the crystal 23 for movement longitudinally of the fixed member 33 at all times in alinement with the ray beam 21 defined by the slit 17. The crystal 23 may be mounted, as in a suitable bracket adapted to secure the crystal upon a carrying link 37, as at an end thereof, said link being provided with an outstanding pin 39 adjacent the crystal at one end of the link in position to extend in and ridingly engage the slideway 35. The opposite end of the link is pivotally connected, as by means of a pin 41, with one end of a bisecting link 43, the opposite end of which is mounted for pivotal movemement on the main frame about a pin 43' in alinement with the beam defining slit 17. As a consequence of the foregoing arrangement, the angularity of the crystal 23 with respect to the beam 21 will be progressively changed as the crystal is moved along the member 33 toward or away from the plate carrying the slit 17.

The mechanism 31 also comprises means adjustable in response to movement of the crystal along the member 33 to dispose the detector 25 at all times in focused position with respect to the diffracted beam which emanates from the crystal 23. To this end, the detector is carried on an end of a movable slide member 45 formed longitudinally with a slideway 47, similar to the slideway 35 of the fixed member 33, the pin 39 also being mounted for sliding movement in the slideway 47 toward and away from the detector. The movable slide member 45 carries the slit forming plate 29 adjacent the detector 25, and a bisecting link 49 of length equal to that of the link 43 is pivotally connected at one end on the pin 41, the opposite end of the link 49 being pivotally connected on the member 45 for rocking movement about a pivot pin 49' secured on the member 45 in alinement with the slit 27 in the plate 29.

It will be seen that the mechanism 31 may be adjusted between limit positions to progressively change the angularity of the crystal with respect to the beam 21 from one limit position in which the crystal is disposed in position substantially normal to the beam, through the intermediate positions shown in Figs. 1 and 2 of the drawings to another limit position shown in Fig. 3, in which the crystal is disposed in position substantially at right angles with respect to its said normal position, the detector being at all times disposed in position to receive impingement of the diffracted beam through the slit 27. It will be noted that, in each position of adjustment of the mechanism 31, the diffracting surface of the crystal 23 and the beam guiding slits 17 and 27 lie on a focusing circle 51 of uniform size for all adjusted positions of the mechanism 31. It will be noted, also, that the detector slit 27 follows a precisely defined path 53 with respect to the main frame when the mechanism 31 is moved between its limit positions. Said path 53 is preferably defined by a cam groove formed in a portion of the main frame traversed by the pivot pin 49'; and said pivot pin may have an end formed as a cam follower extending in and adapted to travel along the groove defining the path 53, to thereby facilitate adjusting movement of the mechanism 31.

In order to ascertain the X-ray spectrum of the material of the examination sample 13, it is necessary to measure the spectral angularity of the various material identifying spectral lines contained in the diffracted beam. Such diffraction angularity, commonly referred to as the Bragg angle, is the angle $\theta$ made between a line tangent to the focusing circle at the axis of the pin 39 which defines the center of the diffracting face of the crystal 23 and either of the straight lines between the pin 39 and the pins 43' and 49', the angle $\theta$ being one-half the angle made between the line joining the pins 39 and 41 and either of the lines joining the pin 41 with the pins 43' and 49'. Accordingly, when the mechanism is adjusted to a position in which the detector responds to a particular spectral line, as determined by X-ray photon count or other conventional ray intensity measuring expedient, the diffraction angle $\theta$ may be determined by measuring the relative angularity of the fixed and movable members 33 and 45, the Bragg angle being one-half of such relative angularity; or the diffraction angle may be determined as one-half of the relative angularity of the link 37 with respect to either of the links 43 and 49.

If desired, the relative angularities of the members 33 and 45, or of the link 37 and arms 43 and 49, may be measured by graduated protractor means mounted on said arms and links. Preferably, however, screw threaded means drivingly connected with the pin 39 may be provided on the main frame for precisely adjusting the distance along the fixed member 33 between the pins 39 and 43'. Such distance, as will be obvious, is a function of the diffraction angle to be measured. As a consequence, the diffraction angle may be measured in terms of the relative position of the pin 39 with respect to its adjusting screw; and such measurement may be disclosed by means of a suitable indicator driven by or in unison with the adjusting screw.

The foregoing fixed focus spectrometric mechanism is particularly useful since adjustment thereof in diffraction analysis requires no motion of the X-ray tube, the sample and the source slit. As a consequence, the mechanism may be employed in analyzing horizontally supported samples, including liquid bodies. The mechanism furthermore is of simple, uncomplicated character in that the diffraction crystal has fixed configuration, thereby avoiding the necessity of providing mechanism for adjusting the shape of the crystal during movement of the mechanism during diffraction analysis.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Diffraction apparatus comprising a support frame or base providing means for supporting a specimen at an examination station in position for irradiation with penetrating rays, a source collimator formed with a slit for defining a beam of secondary radiation emitted from a specimen at said station, a diffraction crystal, a mounting bracket comprising an arm carrying said crystal at an end thereof and forming a pivot pin in alinement with the medial axis of said crystal, a guideway for receiving said pivot pin to control the movement of said crystal in said beam toward and away from said source collimator, a link pivotally connected on said frame and on said arm for progressively adjusting the angularity with respect to said beam of said bracket and the crystal supported thereby as the same is adjusted toward and away from said source collimator, a detector and an associated collimator forming a slit adjacent the detector, a mounting arm carrying said detector and associated collimator and formed for sliding and pivotal movement on said pivot pin to permit adjustment of said detector and associated collimator toward and away from said crystal, and a link pivotally connected between said mounting arm and the arm of said crystal carrying bracket for maintaining the angularity of the detector and associated collimator with respect to the crystal at all times equal to the relative angular position of the crystal with respect to the said defined beam of secondary radiation.

2. Diffraction apparatus as set forth in claim 1, including a calibrated scale for measuring the relative angular position of the crystal with respect to said beam of secondary radiation.

3. Diffraction apparatus as set forth in claim 1, including means for measuring the relative angularity of the crystal in said beam of secondary radiation in terms of the spacement of the crystal with respect to the source collimator.

4. Diffraction apparatus as set forth in claim 1, including turnable screw threaded means drivingly connected with the crystal mounting bracket for adjusting the same in said guideway, and an indicator drivingly connected with said screw and calibrated to show the angular position of the crystal with respect to the beam of secondary radiation.

5. Diffraction apparatus as set forth in claim 1, including means defining a cam groove on said frame or base, and a cam following pin on said detector mounting arm in alinement with the slit of the detector associated collimator in position to ride in and follow said cam groove.

References Cited in the file of this patent

UNITED STATES PATENTS

| | | |
|---|---|---|
| 2,540,821 | Harker | Feb. 6, 1951 |
| 2,783,385 | Wytzes | Feb. 26, 1957 |